Figure 1:
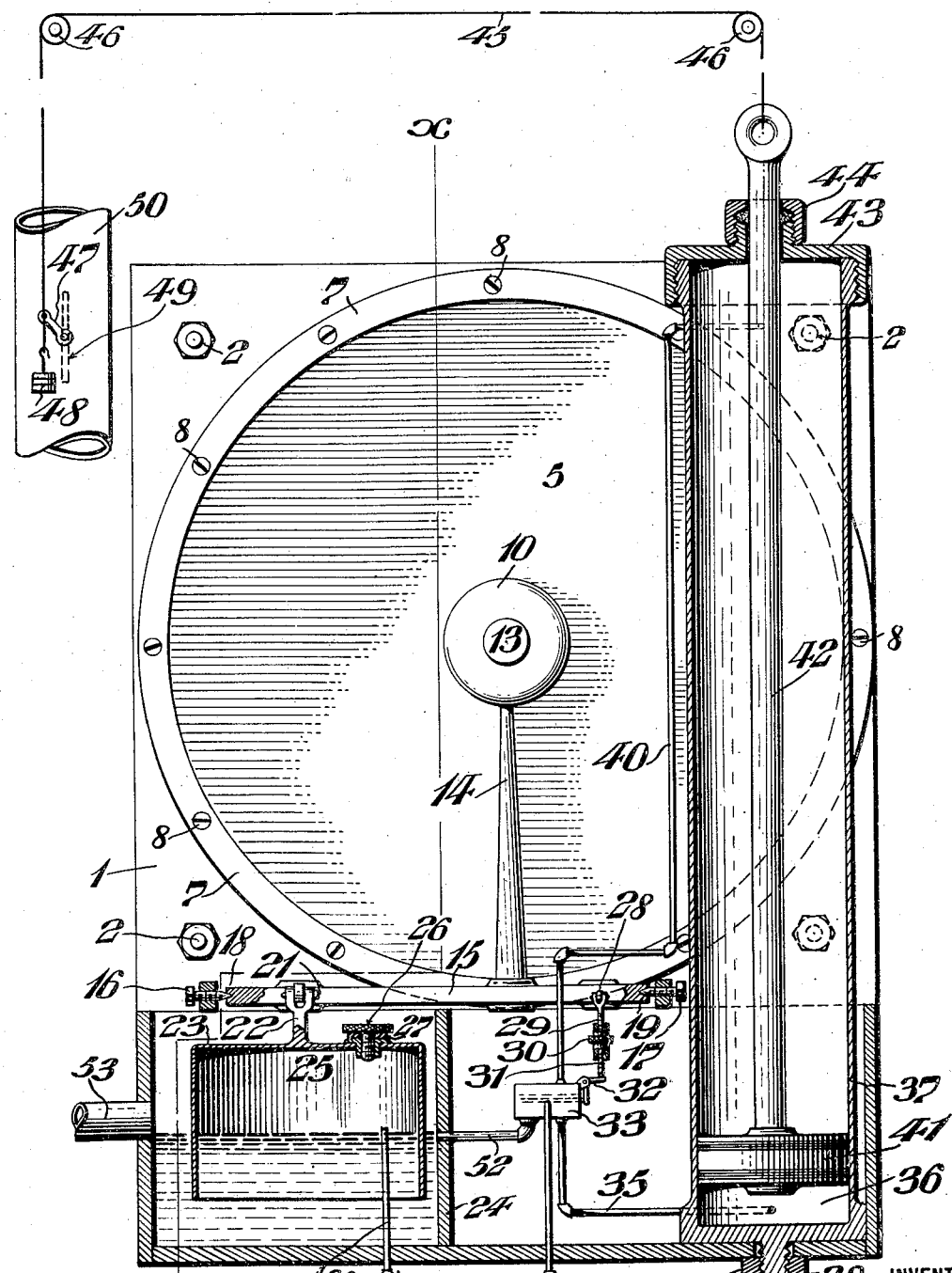

F. H. BROWN.
REGULATION MECHANISM.
APPLICATION FILED DEC. 8, 1911.

1,150,097.

Patented Aug. 17, 1915.
2 SHEETS—SHEET 1.

WITNESSES
H. F. Dieterich
P. F. Nagle.

INVENTOR
Francis H. Brown,
BY Niedershein & Fairbanks
ATTORNEYS

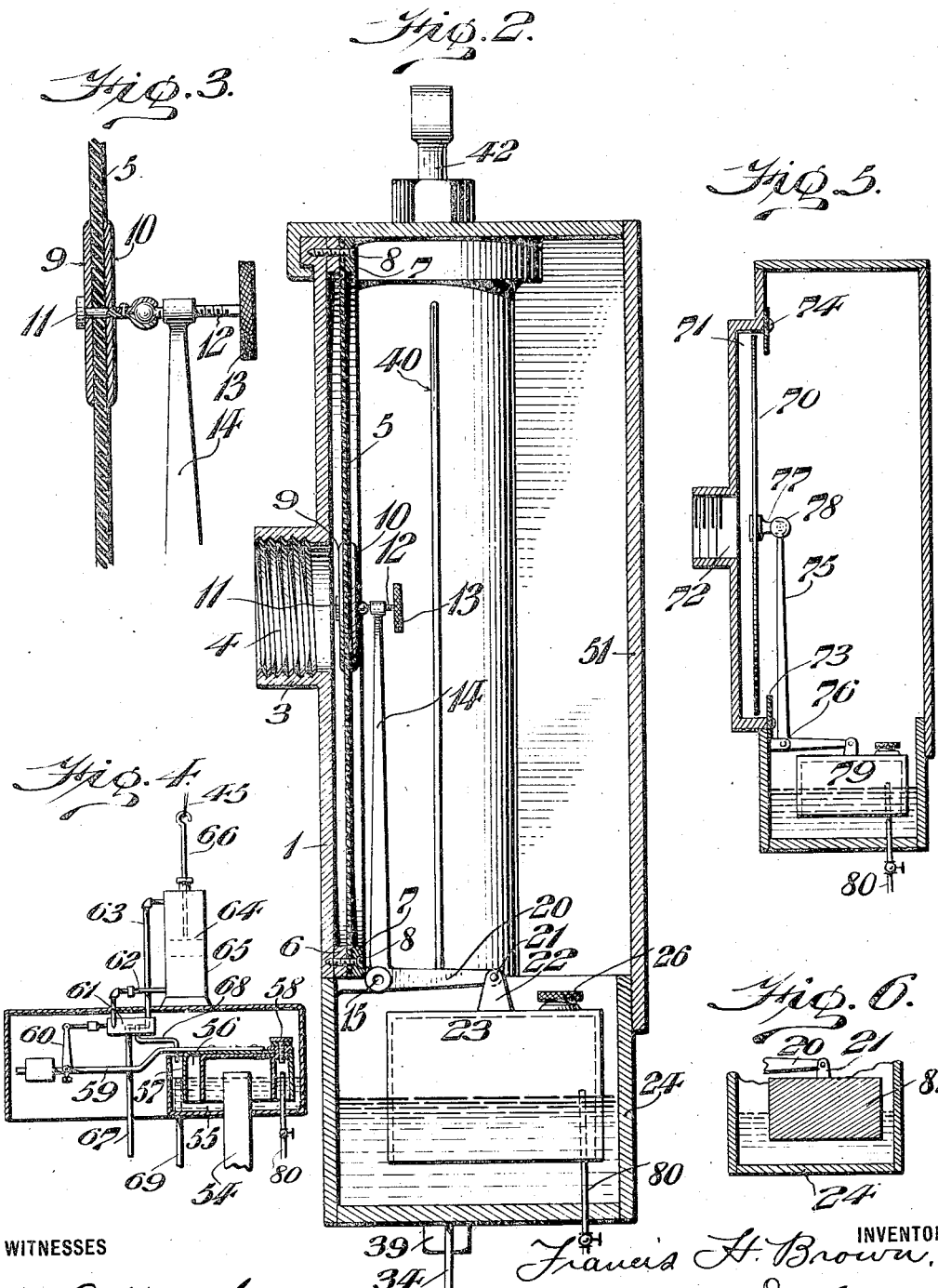

UNITED STATES PATENT OFFICE.

FRANCIS H. BROWN, OF RIDLEY PARK, PENNSYLVANIA.

REGULATION MECHANISM.

1,150,097.         Specification of Letters Patent.         Patented Aug. 17, 1915.

Application filed December 8, 1911. Serial No. 664,613.

*To all whom it may concern:*

Be it known that I, FRANCIS H. BROWN, a citizen of the United States, residing at Ridley Park, Delaware county, State of Pennsylvania, have invented a new and useful Regulation Mechanism, of which the following is a specification.

One of the objects of my present invention is to devise a more accurate and reliable means of operating a valve or other controlling mechanism, than has heretofore been attainable in prior devices, and in order to accomplish this, I provide a diaphragm or its equivalent in communication with a source of variable fluid supply to be controlled such, as for example, the combustion chamber of a furnace, said diaphragm or its equivalent controlling in a novel manner a valve mechanism which in turn controls a motor which latter may be used to operate any desired mechanism, such as, for example, the damper in a flue leading from the combustion chamber or in a draft duct leading into the ash pit.

In prior devices wherein the diaphragm or its equivalent is employed, it has been found that there is a tendency of the diaphragm to move beyond the neutral point to such an extent that the movement of the diaphragm is reversed thereby causing a racing, fluttering or beating movement of the diaphragm and consequently of the damper or other mechanism operated, and my device is designed to overcome this defect.

With the above and other objects in view which will hereinafter more clearly appear in the detailed description, my invention consists in its broad and generic scope of a novel correcting device which will maintain a member acted upon by variations of pressure within a predetermined range of action.

It further consists of a member acted upon in one direction by a variable pressure, and novel damping means tending to prevent the member passing beyond its neutral point on its return movement in either direction.

My invention further consists of a novel correcting device wherein a container is operatively connected with the diaphragm or its equivalent and sealed in a liquid and wherein means are provided for varying the volume of air within said container so that during the movement of the diaphragm the air within the container will either be compressed or the liquid therein will be lifted to cause the diaphragm to return to its neutral point and limit the movement of the diaphragm to a predetermined range.

It further consists of a novel construction of a float which is sealed in liquid and operatively connected with a member actuated upon by variations of pressure, and novel means for maintaining within the float a pressure corresponding to the neutral point of pressure which it is desired to maintain on the side of said member which is subjected to the variable pressure.

It further consists of other novel features of construction all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a sectional elevation of a regulating mechanism embodying my invention. Fig. 2 represents a section on line *x—x*, Fig. 1, certain parts having been removed for the sake of clearness of illustration. Fig. 3 represents a sectional elevation, on an enlarged scale, of a portion of Fig. 2. Fig. 4 represents another embodiment of my invention as applied to a well known type of regulating mechanism. Figs. 5 and 6 represent sectional elevations of other embodiments of my invention.

Similar numerals of reference indicate corresponding parts in the figures.

Referring to the drawings: 1 designates the casing of my novel regulating mechanism which is secured in position by means of fastening devices 2, said casing having an apertured extension 3 therein communicating with a source of fluid supply having a variable pressure and, in the present instance, for the sake of illustrating one manner of employing my invention, I have shown the apertured extension 3 threaded as indicated at 4, thereby adapting the same to be connected with a conduit leading to the interior of a furnace or any other source of variable fluid contact.

5 designates a diaphragm of any desired construction which is mounted in proximity to the apertured extension 3 and in order to illustrate one manner of mounting the same, I have shown washers 6 and 7 between which the diaphragm 5 is mounted, and fastening devices 8 which pass through the washers 6 and 7 at the outer periphery of the diaphragm 5 and engage the casing 1 to maintain the parts in assembled position. The diaphragm has located on opposite sides thereof plates 9 and 10 secured in position in any desired manner and having fastening devices 11 secured with respect thereto, one end of which forms a socket in which the ball of the threaded rod 12 is seated, said rod being provided with an adjusting handle 13 it being understood that in the broad scope of my invention the rod 12 is pivotally connected with respect to the diaphragm 5 in any desired manner and I have shown a ball and socket joint simply to illustrate one manner of forming an adjustable pivotal connection. The rod 12 is in threaded engagement with a lever 14, connected with a lever 15, which latter is mounted in anti-friction devices, the same, in the present instance, consisting of tapered or conical bearing pins 16 and 17 which engage the recesses 18 and 19 in the lever 15. The lever 14 has an arm 20 extending therefrom to which is pivoted at 21 a forked arm 22 which latter is secured to a float or inverted casing 23, located within a tank or container 24, which is adapted to receive a fluid of any desired density such as for example water, oil, mercury, or other fluid and which form a seal for the lower end of the inverted casing 23, so that in the upper portion of said casing a fluid chamber 25 is provided between the surface of the fluid in the container 24 and the upper end of the casing 23. In order that pressure within the chamber 25 may be varied as desired, I provide a valve 26 having a packing 27 so that a desired or predetermined pressure on the fluid within the chamber 25 may be formed, so that a predetermined correcting operating pressure within the chamber 25 may be maintained, as will be hereinafter more clearly set forth in the description of the operation. The lever 15 has also connected therewith an arm 28 which is pivotally connected to a link 29 which latter has mounted thereon a turn-buckle or adjusting nut 30 which is also in threaded engagement with a rod 31 secured to a bell crank lever 32 which controls the inlet valve of a valve mechanism 33 which may be of any desired or conventional type and I have therefore deemed it unnecessary to illustrate or describe in detail in the present instance, a specific type of valve mechanism, since any desired type of valve mechanism may be employed. The motive fluid such as, for example, water under pressure, enters the valve mechanism 33 through inlet pipe 34 which is connected with a suitable source of fluid supply, and the motive fluid passes through pipes 35 and 40 to the opposite ends of a piston chamber 36 of a motor casing 37 which is secured in any desired manner with respect to the casing 1 or may be located at any desired distance therefrom as is evident.

In the present instance the motor casing 37 is shown as having a threaded extension 38 which extends through the casing 1 and is secured with respect thereto by means of a nut 39. Between the points of discharge of the pipes 35 and 40, which alternately serve as inlet and exhaust to the piston chamber 36 is located a piston or motor 41 to which is connected a rod 42 which extends through the removable end 43 of the casing 37 a suitable stuffing box 44 being provided.

45 designates a cable of any desired nature one end of which is connected to the rod 42 said cable passing over pulleys 46 and connected with the device which it is desired to control and which I have shown for purposes of illustration as being an arm 47 having an adjustable counterbalance 48 and connected with a damper 49 which is pivoted in a flue or conduit 50 which may be a conduit through which the products of combustion pass from the furnace or the conduit through which the draft enters the furnace for either primary or secondary combustion, or both, although in the broad scope of my invention, as will be apparent, my novel regulating mechanism may be employed for controlling any desired mechanism.

In order that the operation of the parts may be readily inspected, I provide a removable closure 51 as will be apparent from Fig. 2.

In case water is employed as the sealing medium for the float 23, I may provide a discharge conduit 52 leading from the valve mechanism 33 and discharging into the container 24 which latter is provided with an overflow conduit 53 whereby the water in the container 24 will be kept at a uniform level, it being understood that in the broad scope of my invention any desired means may be employed for maintaining the fluid in the container 24 at a constant level.

In the embodiment seen in Fig. 4, I have shown a device similar in principle and operation to my prior Patent, #883,283 patented March 31st, 1908, but having in conjunction therewith novel means for returning the movable member to its neutral point and preventing it passing beyond such point.

In the embodiment seen in Fig. 5, I have shown another manner of carrying out my invention wherein instead of utilizing a diaphragm, I employ a movable member having any desired contour and shown in the present instance as consisting of a plate 70, preferably metallic, which is adapted to travel within a chamber 71 the outer periphery of said plate being preferably out of contact with the walls of said chamber 71 in order to eliminate the friction. 72 is an apertured conduit leading to the combustion chamber of the furnace or to any desired source of variable fluid supply to be controlled. 73 is a stop member consisting in the present instance of a ring secured to the container wall by suitable fastening devices 74. 75 is a lever fulcrumed at 76 to the container casing and having one end secured to a post 77 carried by the plate 70 by means of a set screw or equivalent fastening device 78 whereby the plate 70 will be carried by the lever 75 in such a manner that it will not contact with the walls of the chamber 71. The other end of the lever 75 has pivoted thereto an inverted float 79 in a similar manner to that described in Figs. 1 and 2 and since the construction and operation of this tank is similar to that already described, the same will be readily understood.

In Fig. 6 I have shown another embodiment of my invention wherein instead of employing an inverted float, such as 23, which has an air cushion, I employ a solid block of material 81 and it is to be understood that such construction is within the broad and generic scope of my invention.

Referring first to the embodiment seen in Figs. 1 to 3 inclusive, the apertured conduit 3 is connected with any desired source of variable fluid supply to be controlled, such as, for example, the combustion chamber of a furnace, in order that a variation of pressure therein will cause the movement of the diaphragm 5. Assuming that the pressure increases it will act upon the diaphragm 5 in such a manner as to cause the latter to move outwardly with respect to the apertured conduit 3, the result of which will be that the lever 14 will be rocked on its fulcrums 18 and 19 thereby causing the connecting rods 29 and 31 to move downwardly to actuate the bell crank lever 32 and thereby the valve of the valve mechanism which controls admission of motive fluid through conduit 34, valve mechanism 33, and thence through conduit 40 into the motor casing 37 to cause the piston 41 therein to move downwardly the result of which will be to exert a pull on the cable 45 and cause the valve 49 in the conduit 50 to move in the direction of an open position, as indicated in dotted lines in Fig. 1. As the rod 15 secured to the lever 14 is rocked on its fulcrums 18 and 19, the inverted float 23 will be forced downwardly into the sealing fluid within the container 24. As soon as the pressure to be controlled falls to the predetermined fixed standard of pressure, due to the opening of the valve 49 in conduit 50, which latter communciates with the pressure being controlled, thereby decreasing the pressure against the diaphragm 5, the air cushion 25 will exert a pressure against the arm 20 of the lever 14 and aid in returning the diaphragm 5 to its neutral position and prevent it passing beyond it. As soon as the diaphragm 5 returns to its neutral position, the air cushion within the chamber 25 will also be at its neutral condition of pressure. If the variable pressure to be controlled decreases then the diaphragm 5 will move inwardly thereby rocking the lever 14 on its fulcrum and causing the valve mechanism to be operated in such a manner as to cause the motive fluid to pass through conduit 35 to move the piston 41 in a reverse direction and operate the valve 49 in a reverse direction. Simultaneously therewith the inverted float 23 will be raised thereby raising therewith the fluid contained within the inverted float which tends to resist the upward movement of the float 23 and when the piston 41 has moved the valve 49 in the conduit 50 thereby correcting the pressure within the furnace to the fixed or operating standard, the inverted float will aid in causing the diaphragm to return to its neutral position. It will thus be seen that when the diaphragm 5 moves in either direction from its neutral position the air cushion 25 and the liquid seal will coöperate with the varying condition of pressure being controlled in such a manner as to cause the diaphragm 5 and the inverted float 23 to be returned to their neutral or nonoperative position, and prevent the diaphragm passing such point on its return movement.

In the embodiment seen in Fig. 5, the operation is the same except that instead of employing a member which is fixed at its outer periphery, I employ a member which is movable at its outer periphery so that the variations in pressure will cause the member 70 to be moved in one direction or the other the outward movement being limited by the stop 73 and the inward movement by the walls of the chamber 71. Assuming it is desired to operate the furnace or other sources of variable pressure to be controlled at a pressure lower than the predetermined standard above described, then the closure 26 would be removed after which the members 29 and 31 of the valve mechanism would be shortened by the actuation of the thumb nut 30 which would cause the valve to be operated to permit motive fluid to enter above the piston 41 to cause the same to be moved downwardly opening the valve 49 to a point restoring the normal predetermined pressure within the furnace. The closure 26 would then be replaced with the float in its neutral position, the result of which would be that the mechanism would then control the furnace pressure at the newly adjusted standard. In a similar manner by lengthening the connecting members 29 and 31 and readjusting the closure 26 the diaphragm 5 may be set to a neutral point which will be a standard of pressure greater than the former standard. Thus I am enabled to adjust my novel mechanism to operate at any desired standard of pressure of vacuum.

Referring now to the embodiment seen in Fig. 4, I have shown a construction similar to that illustrated and described and broadly claimed in my prior Patent #883,283, granted to me March 31, 1908, but in this prior patent no means are shown for correcting the movement of the pivoted member to prevent its passing beyond the neutral point. In this embodiment I have shown a double inverted float and a closure 58 which controls admission of pressure to the chamber 56. In case a high pressure is required to be employed, it is advantageous in some instances to use a pressure in the chamber 56 corresponding to the pressure which it is desired to control, in which case fluid pressure is introduced through the valve controlled conduit 80 into the chamber 56 in order to increase the pressure therein to the predetermined standard desired.

It will be seen that by the employment of an air cushion as herein shown and described the movable member which is acted upon by variable pressure will be prevented from racing, fluttering, or beating, and an elastic stop is formed tending to prevent the movable member traveling beyond its neutral point on its return to its neutral position from its working stroke in either direction.

In so far as I am aware, I am the first in the art to devise a construction embodying these features and it is to be understood that my claims to the same are to be broadly interpreted with corresponding scope. In devices of this character as heretofore employed, it has been found that after the movable member has passed from its neutral position to the operating position in either direction and is returned to its neutral position, that on its return movement it passes beyond said neutral point then reversing and again going beyond the neutral point in the opposite direction thus setting up a continuous racing motion, and it has been found impossible in prior devices to prevent this action. By my novel construction I have devised a device which will accurately and automatically accomplish this result on the movement of the movable member such as 5 or 70 in either direction.

My novel regulating mechanism is adapted to be used for combustion regulation in which case it would be connected with the furnace or combustion chamber of the furnace in a manner similar to that well known in the art and such as is clearly described in my prior Patent #883,283 to which reference may be had for a detailed description of the same, it being understood that in such case the conduit 50 would be the exhaust flue for the waste products of combustion leading from the furnace and it also being understood that my device may be operated in connection with either a natural or a mechanical draft and that either the natural or mechanical draft or both may be automatically controlled, and my novel device herein disclosed may be used, if desired, in conjunction with a furnace in which the entire operation of the furnace is automatically controlled.

In the embodiment seen in Figs. 1, 2 and 3 the position of the upper end of the lever 14 relatively to the diaphragm 5 may be adjusted as desired, by actuation of the grasping handle 13 to cause the end of the lever 14 to move outwardly or inwardly with respect to the diaphragm 5 the result of which will be that the predetermined standard of operating pressure will be varied to the standard pressure desired.

In Fig. 5 the movable member 70 may be adjusted in such position by means of the fastening devices 78 that it will not engage with the walls of the chamber 71. It will be understood from Fig. 5 that I have disclosed therein an element movably mounted and counterbalanced to lie in substantially a perpendicular plane when in neutral position, and this element such as 70 has exerted against opposite sides thereof different pressures so that a lateral movement is imparted to the upper portion of such element. In so far as I am aware such construction is generically novel either alone or in conjunction with dampering means, and it is to be understood that my claims thereto are to be interpreted as of corresponding scope.

It will be seen that I am enabled with my present novel device to vary the standard of working pressure in several different ways. This can be accomplished, as heretofore explained, by adjusting the nut 30 to vary the time at which the valve mechanism operates. This can also be accomplished by injecting a fluid pressure through the valve controlled conduit 80. This can also be accomplished by manipulation of the closure 26 to vary the pressure within the air chamber of the float 23. This can also be accomplished by adjustment of the screw 12 to vary the relative position of the upper end of the arm of the lever 14 with respect to the diaphragm 5 or its equivalent.

It will now be apparent to those skilled in this art that in my present invention I have provided novel means for damping out the vibrations of a movable element and means for stopping it at its neutral position on its return movement to such position. It will be understood that the damping means offers a yielding resistance to the movement of said movable member in either direction away from its neutral position and this resistance increases in accordance with the amount of such movement of the movable element. On the return movement of the element to its neutral position, the damping means assists in such movement and serves to stop said element at its neutral position on such return movement. The movable element is actuated in one direction or the other by opposing forces one of which is substantially constant while the force acting in an opposite direction is variable. The movable element actuates mechanism when said variable force is different from the opposing force which causes an equalization of the opposing forces and by means of the pull of the damping means returns the element to its neutral position.

In the construction illustrated as one manner of carrying out my invention in practice, the float with the air cushion or the solid float is forced down into or lifted with respect to the liquid so that on the movement in either direction of the movable element an increasing but yielding resistance is exerted to the movement of such element. As soon as the forces have been equalized the member returns to its neutral position and stops at such position, owing to the pull and yielding resistance exerted by the float in the liquid.

In so far as I am aware, I am a pioneer in the subject matter of the present invention and I am the first in the art to devise means to coöperate with a movable element in the manner herein set forth and it is to be understood that my claims are not to be construed as relating to a mere improvement of prior devices but are to be generically construed with corresponding scope.

It will now be apparent that I have devised a novel and useful construction of a regulation mechanism which embodies the features of advantage enumerated as desirable in the statmeent of the invention and the above description, and while I have in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. The combination with a member acted upon on opposite sides by different pressures to move said member in one direction or the other, of damping means which coöperates with said member to stop said member at its neutral point on its return movement toward such point, and mechanism controlled by said member.

2. The combination with a member acted upon on opposite sides by different pressures to move the same in either direction, of damping means coöperating with said member and which stops said member at its neutral point on its return movement toward such point, means for varying the standard of pressure to be maintained by said member, and mechanism controlled by said member.

3. The combination with a member acted upon on opposite sides by different pressures, of an elastic stop coöperating with said member to stop it at its neutral point on its return movement toward said neutral point, and valve mechanism controlled by said member.

4. The combination with a member acted upon on opposite sides by different pressures, of damping means which stop said member at its neutral point on its return movement toward said point, a motor controlled by said means and mechanism controlled by said member.

5. The combination with a member acted upon on opposite sides by different pressures, of damping means which stop said member at its neutral point on its return movement toward such point, devices for causing said member to be actuated at any desired standard of pressure, and mechanism controlled by said member.

6. The combination with a member acted upon on opposite sides by different pressures, of damping means which stop said member at its neutral point on its return movement toward said point, and devices for causing said member to be actuated at a standard of pressure lower than atmospheric.

7. The combination with a movable member acted upon on one side by pressure within the furnace and on the opposite side by pressure different from that within the furnace, of damping means which stop said member at its neutral point on its return movement toward said point, a motor controlled by said means, and mechanism controlling the exit of the products of combustion from the furnace and controlled by said motor.

8. The combination of a member moved in one direction by the pressure of the furnace gases and in the opposite direction by a pressure different than that of the furnace gases, of damping means which stop said member at its neutral point on its return movement toward said point, a motor controlled by said member, a draft conduit, and valve mechanism controlling the passage of fluid through such draft conduit and in turn controlled by said motor.

9. The combination of a movable member acted upon on opposite sides by different pressures, of a fulcrumed lever having one end connected with said member and actuated thereby, a float connected with the opposite end of said lever, a liquid containing tank in which said liquid is located, and mechanism controlled by said movable member.

10. The combination with a movable member acted upon on opposite sides by different pressures, of a fulcrumed lever having one end connected with said member and actuated thereby, an inverted float connected with the other end of said lever, a liquid containing tank in which said float is sealed, and mechanism controlled by said member.

11. The combination with a member acted upon on opposite sides by different pressures, of a fulcrumed lever actuated by said member, an inverted float connected with said lever, means for varying the pressure within said float, and mechanism controlled by said member.

12. The combination with a member acted upon in opposite directions by different pressures, of a fulcrumed lever connected with said member and actuated thereby, an inverted float pivotally connected with said lever, a removable closure for said float, a liquid container in which said float is sealed, and mechanism controlled by said member.

13. The combination with a member acted upon in opposite directions by different pressures, of a lever pivotally supported and connected with said member, a float connected with said lever and provided with an air chamber, means for maintaining any desired pressure within said air chamber, and mechanism controlled by said member.

14. The combination with a member acted upon in opposite directions by different pressures, of a lever pivotally supported and actuated by said member, a correcting device connected with said lever and forming an elastic stop for said member on its return movement to its neutral position, and mechanism actuated by said member.

15. In a device of the character stated, an element movably mounted and normally supported in substantially a perpendicular plane when in neutral position, mechanism actuated by said movable element, said element having different pressures exerted against opposite sides thereof, and damping means including a fluid cushion and offering an increasing but yielding resistance to said movable element in its movement in either direction away from its neutral position, and aiding said movable element in its reverse movement toward its neutral position and serving to stop said element at its neutral position on such return movement.

16. The combination with an element movably mounted and subjected on opposite sides to opposing forces to move said element in one direction or the other, one of said forces being variable, of mechanism actuated by said movable element to maintain said variable force substantially constant, and means including a fluid cushion to offer an increasing but yielding resistance to the movement of said element in either direction away from its neutral position, said means aiding said element in its reverse movement toward its neutral position and serving to stop said movable element at its neutral position on such return movement.

17. The combination of an element movably mounted and moved in one direction or the other by opposing forces, one of which is substantially constant and the other of which is variable, mechanism actuated by said element when said variable force is different from the opposing force to equalize said forces and to thereby return said movable element to its neutral position, and means including a fluid cushion to offer a yielding resistance to the movement of said element in either direction away from its neutral position, said means also aiding said element in its reverse movement toward its neutral position and also stopping said element at its neutral position on such return movement.

18. The combination of a member movably mounted, of means to exert a substantially constant pressure against said member in one direction, means to exert a variable pressure against said member in an opposite direction, mechanism actuated by said member to correct the variable pressure to a substantially constant standard of pressure and thereby return said member to its neutral position, and means including a liquid container, and a fluid cushion in the container and connected with said member to automatically stop said member on its return movement to its neutral position from either direction.

19. A movable member acted upon on opposite sides by different pressures, mechanism controlled by said member, and means to damp out the vibration of the movable member, said means comprising, a liquid container, and an element therein operatively connected with and actuated by said member and damping out the vibration thereof by varying the displacement of liquid in said liquid container.

FRANCIS H. BROWN.

Witnesses:
H. S. FAIRBANKS,
C. D. McVAY.